July 30, 1968     W. H. HORTON ETAL     3,394,643

FILM WINDING AND SHUTTER ACTUATING MEANS

Filed Nov. 5, 1965     2 Sheets-Sheet 1

WILLIAM H. HORTON
JAMES E. DIERKS
EDWARD L. STURM
MICHAEL S. MONTALTO
INVENTORS

BY R. Frank Smith

Thomas R. Lampe

ATTORNEYS

July 30, 1968   W. H. HORTON ET AL   3,394,643
FILM WINDING AND SHUTTER ACTUATING MEANS
Filed Nov. 5, 1965   2 Sheets-Sheet 2

WILLIAM H. HORTON
JAMES E. DIERKS
EDWARD L. STURM
MICHAEL S. MONTALTO
INVENTORS

BY R. Frank Smith
Thomas R. Lampe
ATTORNEYS

United States Patent Office 3,394,643
Patented July 30, 1968

3,394,643
FILM WINDING AND SHUTTER ACTUATING MEANS
William Howard Horton, James Edward Dierks, Edward Louis Sturm, and Michael Samuel Montalto, Rochester, N.Y., assignors to Eastman Kodak Company, Rochester, N.Y., a corporation of New Jersey
Filed Nov. 5, 1965, Ser. No. 506,556
5 Claims. (Cl. 95—31)

ABSTRACT OF THE DISCLOSURE

In a photographic camera, a simplified device for providing automatic shutter cocking and film advancing utilizes a manually movable, spring-loaded, shutter-control member having three engaging portions—one portion to latch a rotatable, spring-loaded, shutter-actuating lever in its cocked position; another portion to lock a motor-driven, film-take-up shaft when the control member is moved to unlatch the shutter-actuating lever; and a third portion to displace axially a spring-loaded, shutter-cocking drive gear, rotatable with the shaft, from the path of movement of a mating, shutter-cocking gear segment, rotatable with the shutter-actuating lever, when the control member is moved to unlatch the shutter-actuating lever and lock the shaft—so that, upon manual movement of the control member, the shutter-cocking and film-advancing drive is disabled and the shutter actuated to effect a photographic exposure; and, upon spring-return of the control member, the shutter-cocking and film-advancing drive is re-enabled to return the shutter-actuating lever to its cocked position and advance the film for a succeeding photographic exposure.

---

This invention relates to a camera construction incorporating an automatic film winding arrangement and, more particularly, to a system operatively associated with a camera shutter control member to (1) actuate the associated shutter mechanism through a spring-biased, high-energy lever group and (2) provide for the advancement of photographic film in the camera and the simultaneous return of the high-energy lever group to its "cocked" position.

Numerous arrangements have been employed in the past in photographic cameras to concurrently "cock" or set the camera shutter mechanism and position the film in the camera so that an unexposed frame is positioned for exposure during the next operating cycle. Arrangements of this type tend to be mechanically complex and utilize such a number of parts that maintenance problems become a serious handicap. In addition, the complexity of such devices makes them prone to mechanical failure, with the resulting skipping of an exposure frame, or results in the inadvertent operation of the shutter mechanism when the film has not been advanced a proper amount.

It is therefore an object of this invention to provide an improved, more reliable means of this general type for use with photographic cameras employing a motor drive mechanism which concurrently sets the camera shutter mechanism and positions the film in the camera so that an unexposed frame is positioned for exposure during the next operating cycle, such means being of a simple, rugged construction, virtually foolproof in its operation.

An additional object is to provide a film winding-shutter actuating mechanism which is operatively associated with a camera shutter control members.

These objectives have been attained in the present invention by providing an interlock of simple, rugged construction for the simultaneous advancement of film and the setting of a shutter actuating mechanism, said shutter actuating mechanism being actuated by manual depression of camera shutter control member and the setting of such mechanism being accomplished in response to return of said member to its initial position.

Other objects, purposes, and characteristic features of the present invention will be obvious from the accompanying drawings and the following description of the invention. In describing the invention in detail, reference will be made to the accompanying drawings in which like reference characters designate corresponding parts throughout the several views, and in which.

Figure 1:
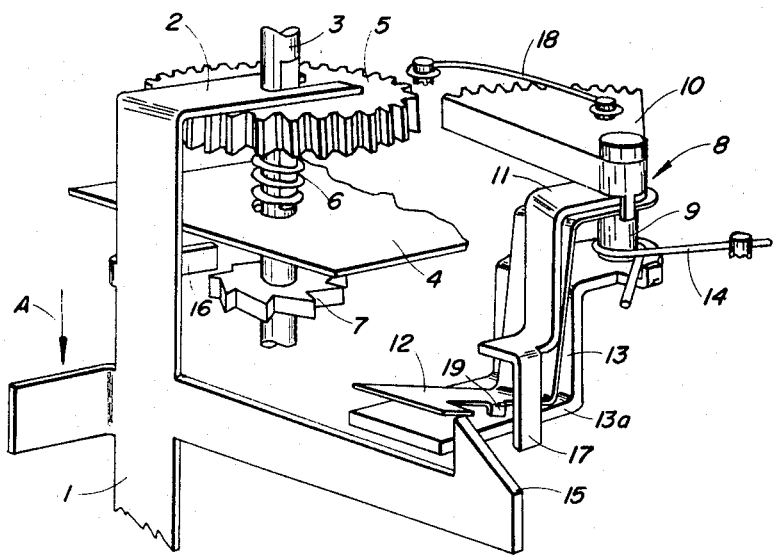
FIG. 1 is a simplified, schematic, perspective view of the present invention showing the position of the elements thereof prior to the depression of the camera shutter control member by the operator.
Figure 2:
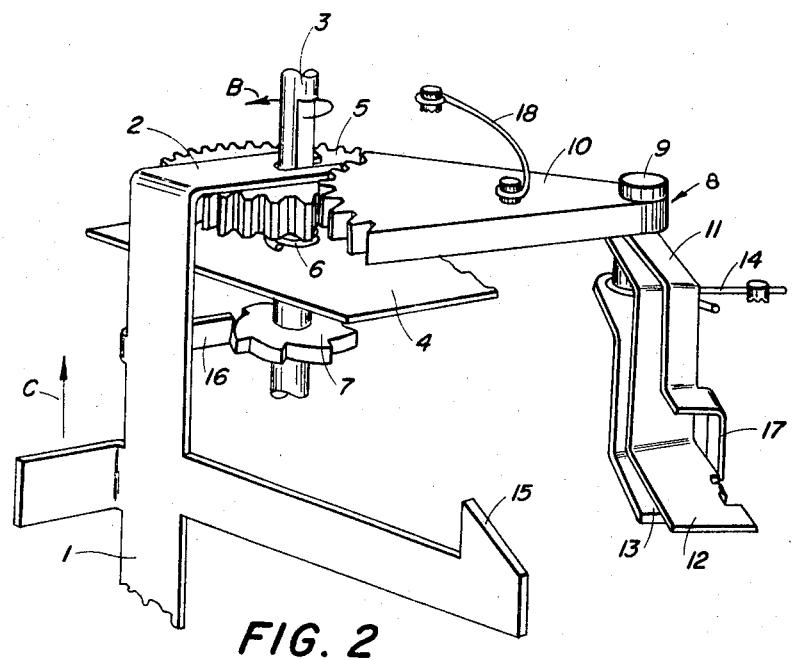
FIG. 2 is a simplified, schematic, perspective view of the elements of the present invention showing the position they assume after depression of the camera shutter control member by the operator.

Referring now to FIGS. 1 and 2, the camera shutter control member 1 is shown as being mounted for reciprocatable motion on the camera body housing (not shown) in any suitable manner. A portion of shutter control member 1, of course, extends externally of the camera housing so that it may be readily manipulated and positioned by the operator in the usual manner. A portion of shutter control member 1 is bent in the manner shown to provide a drive fork member 2 having a bifurcated end. The bifurcated end of drive fork member 2 is positioned about a shaft 3 for free sliding movement with respect thereto. Shaft 3 is connected in any suitable manner to the film take-up spool (not shown) and the camera drive motor mechanism (not shown). For the purposes of understanding the present invention, it is necessary to know only that, as shaft 3 rotates, the film in the camera is advanced onto the take-up spool in the well known manner, thereby advancing an unexposed frame to its proper position with respect to the camera exposure control system. Shaft 3 is rotatably mounted in a mounting plate 4 which extends from, and is attached to, the camera body housing (not shown). A drive gear 5 is mounted on a keyway on shaft 3 in such a manner as to be freely slidable longitudinally with respect thereto but adapted to be rotated therewith. The circumference of shaft 3 is slightly less than the corresponding dimensions of the inner mounting surfaces of drive gear 5 so that drive gear 5 may be tiltably displaced with respect to shaft 3 upon application of force to the periphery thereof, for the purpose to be more fully brought out below. A coil spring 6 is positioned on mounting plate 4 and about shaft 3 in the manner shown and bears against the lowermost surface of drive gear 5, thereby urging gear 5 in an upward direction (as viewed in FIGS. 1 and 2) so that gear 5 bears against drive fork member 2. A ratchet member 7 is rigidly attached to shaft 3 in any suitable manner for rotation therewith.

Disposed adjacent to shutter control member 1 is a high-energy shutter-actuating group, indicated generally by reference numeral 8, which will now be described in detail. Rotatably journaled on mounting post 9 are gear segment 10, return lever 11, and spring lever 12, all of which are keyed together in any desired manner so that they may move in unison about mounting post 9. Independently rotatably journaled on mounting post 9 is an irregularly shaped, high-energy lever 13 which is biased in a counterclockwise direction (as viewed in FIGS. 1 and 2) by means of spring 14. When the high-energy lever 13 is in the position illustrated in FIG. 1, it abuts against the vertical portion of triangularly shaped tab 15 which comprises a portion of shutter control member 1.

The operation of the device will now be described. Referring now to FIG. 1, the high-energy shutter-actuating group 8 is shown in its "cocked" position, ready for tripping by the operator. For the purposes of properly understanding the operation of the mechanism, it should be understood that shaft 3, drive gear 5, and ratchet member 7 are continuously urged in a counterclockwise direction, as viewed in the drawings, by any conventional film advancing drive motor commonly associated with photographic cameras, such motor being preferably, but not necessarily, of the spring-drive type which is energized by the operator in some manner, such as by rotation of an associated winding knob. It is obvious that other types of drive motors, such as electric motors, might be used without departing in any way from the spirit or scope of the present invention.

Whenever automatic film drives of the preceding type are employed in a still camera, it is necessary to arrest rotational movement of the film advancing means in a periodic manner to effectively position the film used in the camera in a frame-by-frame sequence. One such mechanism for accomplishing this end is disclosed in related Sapp et al. U.S. application Ser. No. 257,514, filed on Feb. 11, 1963, now U.S. Patent No. 3,232,196, issued Feb. 1, 1966, wherein a linkage mechanism is disclosed which periodically senses code apertures in the associated film and, in response to the sensed position thereof, arrests movement of the film advancement mechanism when an unexposed portion of the film has been operatively positioned with respect to the camera exposure-control system. Film arresting mechanisms of this type form no part of the present invention, and detailed description thereof has been omitted for the sake of simplicity and to enable proper understanding of the present invention.

As is also disclosed in the aforementioned U.S. application Ser. No. 257,514, now U.S. Patent No. 3,232,196, it is customary to provide a suitable linkage means, responsive to the actuation of the camera shutter control member and the subsequent exposure of an unexposed portion of film, to initiate advancement of the film to the next unexposed frame. As with the details of the film aperture sensing means, the means whereby the film advancement mechanism is initiated has no direct bearing on the present invention and is explained only insofar as it will aid in the proper understanding thereof.

When the elements of the present invention are in their respective positions indicated in FIG. 1, it is assumed that the photographic film (not shown) has been previously advanced by any desired means so that an unexposed frame thereof is positioned so that it may be exposed upon actuation of the associated shutter means (not shown). In addition, as was previously mentioned, the elements of high-energy shutter-actuating group 8 are in their "cocked" position, with high-energy lever 13 bearing against the vertical surface of triangularly shaped tab 15 in a manner which was previously described. Assuming now that the operator wishes to take a photograph shutter control member 1 is depressed in the direction of arrow A. Upon depression thereof, drive gear 5 is forced in a downward direction on shaft 3 by drive fork member 2, thereby compressing coil spring 6. Concurrently therewith, ratchet lock member 16, which constitutes an element of shutter control member 1, moves into locking engagement with ratchet member 7. In addition, depression of shutter control member 1 actuates any suitable linkage (not shown) to disengage the aforementioned film aperture sensing means (not shown) and the associated film holding means (not shown). The aforementioned U.S. application Ser. No. 257,514, now U.S. Patent No. 3,232,196, may be consulted for details of the operation of mechanisms of this type. Upon release of the film aperture sensing means and associated film holding means, shaft 3, drive gear 5, and ratchet member 7 would be free to rotate in the direction of arrow B (FIG. 2) but for the engagement of ratchet lock member 16 with ratchet member 7. Ratchet lock member 16 therefore provides the only means whereby rotation of such elements is prevented at this stage of the operation.

As shutter control member 1 nears the end of its downward stroke, triangularly shaped tab 15 is withdrawn from locking engagement with high-energy lever 13, thereby allowing said lever to move in a counterclockwise direction under the influence of spring 14. This resulting counterclockwise motion of high-energy lever 13 actuates the camera shutter (not shown), thereby exposing the unexposed frame of photographic film (not shown) which has been previously placed in position in a manner described above. In addition, high-energy lever 13 contacts extension 17 of return lever 11, thereby also rotating in a counterclockwise direction gear segment 10 and spring lever 12. Gear segment 10 is free to move in this direction because drive gear 5, which is normally in the plane of movement of gear segment 10, has been previously urged in a downward direction on shaft 3 by drive fork member 2 so as to be below the path of movement of gear segment 10. As the high-energy shutter-actuating group 8 finishes its counterclockwise stroke, a relatively weak, off-center, toggle spring 18, which is connected to gear segment 10 in the manner shown, drives return lever 11 and spring lever 12 slightly further than high-energy lever 13. At this point, tab 19 of spring lever 12, under the inherent resiliency of said spring lever, which may be constructed of sheet spring metal, slides over the upper surface of high-energy lever 13 and drops into engagement with side 13a of high-energy lever 13.

Figure 3:
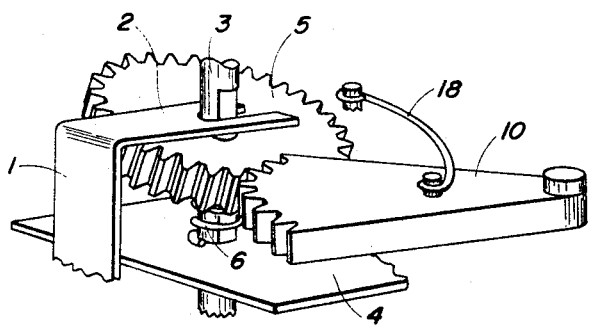
FIG. 3 is a perspective view of certain elements of the invention illustrated in FIGS. 1 and 2 presenting in a schematic fashion the positions assumed thereby during one stage of the operation.

After shutter control member 1 has been depressed and high-energy shutter-actuating group 8 has come to its rest position after actuation of the shutter, the elements of the present device will be in the positions illustrated in FIG. 2. As the operator removes pressure from shutter control member 1, said member will commence movement in the direction of arrow C under the influence of a spring biasing means (not shown) in the usual manner. Drive gear 5 will also commence movement in the direction of arrow C under the influence of coil spring 6 and will be placed into engagement with gear segment 10. Because of the random orientation of drive gear 5 relative to gear segment 10, reengagement may not occur prior to rotation due to lateral "topping" between the top surface of gear 5 and the bottom surface of segment 10 as shown in FIG. 3. To assure engagement in this case, drive gear 5 will be permitted to tilt in the manner shown, if such "topping" does occur, due to the discrepancy between its rather mounting hole with respect to the dimensions of shaft 3. This motion results in immediate engagement to drive gear 5 with segment 10 upon the start of rotation of drive gear 5 in the direction of arrow B (FIG. 2).

Figure 4:
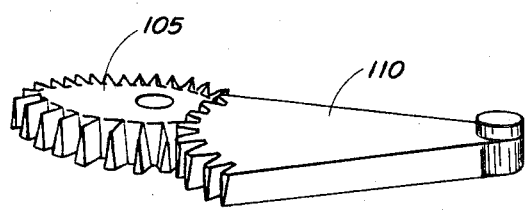
FIG. 4 is a simplified, schematic, perspective view of elements utilized in an alternative embodiment of the present invention.

As a further structural refinement to assure engagement of drive gear 5 with gear segment 10, their engaging teeth may be tapered in the manner shown in FIG. 4. When shutter control member 1 approaches the end of its upward stroke, ratchet lock member 16 is withdrawn from engagement with ratchet member 7 and no longer locks the film winding shaft. The motor shaft 2 then drives the film spool (not shown) and drive gear 5, which, in turn, rotates gear segment 10 in a clockwise direction. Return lever 11 and spring lever 12, keyed to gear segment 10, also rotate, as does high-energy lever 13 due to its engagement by tab 19 of spring lever 12. During this clockwise rotation, high-energy lever 13 and spring lever 12 ride up the inclined portion of triangularly shaped tab 15. At the time the high-energy lever 13 drops off the triangularly shaped tab 15 into latched position, spring lever 12 is still on the ramp due to its elongate contact surface. Therefore, high-energy lever 13 and spring lever 12 are now disengaged, and only return lever 11 and spring lever 12 continue to rotate with the gear segment 10. At this time, the gear segment 10 reaches the end of its engagement with the drive gear 5, and off-center toggle spring 18 continues the clockwise rotation of gear segment 10 until extension 17 of return lever 11 strikes high-energy lever 13 and assumes the position shown in FIG. 1. Rotation of the motor shaft 3 is finally arrested as the metering lever of the film aperture sensing means (not shown) drops into the film perforation and, through suitable linkage, contacts ratchet member 7, thus completing the cycle.

While this invention has been described with particular reference to preferred embodiments thereof, it should be understood that the particular forms disclosed have been selected to facilitate explanation of the invention rather than to limit the number of forms which it may assume. Further, it should be understood that various modifications, alterations, and adaptations may be applied to the specific forms described to meet the requirements of practice without any manner departing from the spirit of the invention or the scope of the subjoined claims.

We claim:

1. In a photographic camera of the type having a motor-driven film advancing mechanism, the combination comprising:
   a rotatable shaft operatively connected with said mechanism to effect positioning of film in said camera;
   movable shutter actuating means mounted in said camera for movement between an initial position and a shutter actuating position, said shutter actuating means including a gear segment having a predetermined path of movement;
   biasing means urging said shutter actuating means toward said shutter actuating position;
   an externally accessible, manually movable shutter control member mounted in said camera for movement between a first position and a second position, said shutter control member having
      first means for preventing movement of said shutter actuating means to said shutter actuating position when said shutter control member is in said first position and for permitting movement of said shutter actuating means to said shutter actuating position when said shutter control member is in said second position and
      second means for preventing movement of said rotatable shaft when said shutter control member is in said second position and for permitting movement of said rotatable shaft when said shutter control member is in said first position; and
   returning means operatively connected with said rotatable shaft for automatically returning said shutter actuating means to said initial position when said shutter control member moves to said first position, said returning means including
      a drive gear keyed to said rotatable shaft for rotation therewith and for axial sliding movement relative thereto and
      means responsive to movement of said shutter control member from said second position to said first position for bringing said drive gear into said path of movement of said gear segment, thereby interengaging said drive gear and gear segment,
   whereby rotation of said rotatable shaft moves said gear segment to return said shutter actuating means to said initial position.

2. The combination claimed in claim 1 wherein said shutter control member has a portion thereof cooperating with said drive gear to position axially said drive gear on said rotatable shaft so as to control selectively the engagement of said drive gear with said gear segment.

3. The combination claimed in claim 2 wherein spring means urges said drive gear into abutting relation with said portion of said shutter control member.

4. In a photographic camera of the type having a motor-driven film advancing mechanism, the combination comprising:
   a movable element operatively connected with said mechanism to effect positioning of film in said camera;
   movable shutter actuating means mounted in said camera for movement between an initial position and a shutter actuating position;
   biasing means urging said shutter actuating means toward said shutter actuating position;
   an externally accessible, manually movable shutter control member mounted in said camera for movement between a first position and a second position, said shutter control member having
      first means for preventing movement of said shutter actuating means to said shutter actuating position when said shutter control member is in said first position and for permitting movement of said shutter actuating means to said shutter actuating position when said shutter control member is in said second position and
      second means for preventing movement of said movable element when said shutter control member is in said second position and for permitting movement of said movable element when said shutter control member is in said first position; and
   returning means operatively connected with said movable element for automatically returning said shutter actuating means to said initial position when said shutter control member moves to said first position;
      said first means on said shutter control member including an elongate arm with a tab thereon, said tab operatively engaging said shutter actuating means when said shutter control member is in said first position, thereby maintaining said shutter actuating means in said initial position, said tab withdrawing from said shutter actuating means when said shutter control member moves to said second position, thereby permitting said shutter actuating means to move toward said shutter actuating position, and
      said shutter actuating means including a first lever operatively engageable by said tab when said shutter actuating means is in said initial position and at least one additional lever cooperating with said first lever to position said first lever in operative engagement with said tab in response to movement of said shutter control member from said second position to said first position.

5. In a photographic camera of the type employing a motor-driven mechanism which simultaneously cocks the camera shutter and advances film in the camera so that an unexposed frame of film is positioned for exposure during a subsequent actuation of the shutter, the improvement comprising:
   an externally accessible shutter control member manually movable from a first position to a second position and returnable from said second position by first biasing means urging said member toward said first position, said member having first, second, and third engaging portions;
   a first power transmitting element rotatable with a shaft operatively connected to motor-driven film advancing means and axially movable relative to said shaft in response to movement of said shutter control member between said first and second positions, said first power transmitting element being axially movable in one direction by said first engaging portion of said shutter control member as said member is moved toward said second position, said first power transmitting element being axially movable in the opposite direction by second biasing means urging said element in said opposite direction as said member is moved toward said first position;

ratchet means rotatable with said shaft, said ratchet means being engageable by said second engaging portion of said shutter control member to prevent rotation of said shaft and said first power transmitting element when said member is moved to said second position, said ratchet means being disengageable from said second engaging portion to permit rotation of said shaft and said first power transmitting element when said member is moved from said second position;

shutter actuating means movable in a first direction by third biasing means urging said shutter actuating means in said first direction for shutter actuation when said shutter control member is moved to said second position, and movable in a second direction for shutter cocking when said member is moved from said second position, said shutter actuating means being engageable by said third engaging portion of said shutter control member to prevent movement of said shutter actuating means in said first direction when said member is in said first position, said shutter actuating means being disengageable from said third engaging portion to permit movement of said shutter actuating means in said first direction when said member is moved from said first position to said second position; and a second power transmitting element movable with said shutter actuating means, said second power transmitting element being engageable by said first power transmitting element to effect movement of said second power transmitting element and said shutter actuating means in said second direction for shutter cocking when said shutter control member is moved from said second position to said first position, said second power transmitting element being disengageable from said first power transmitting element to permit movement of said second power transmitting element and said shutter actuating means in said first direction for shutter actuation when said member is moved from said first position to said second position;

whereby manual movement of said shutter control member from said first position to said second position effectuates shutter actuation for a photographic exposure, and the automatic return of said member from said second position to said first position effectuates simultaneous shutter cocking and film advancement for a succeeding photographic exposure.

References Cited

UNITED STATES PATENTS

| | | | |
|---|---|---|---|
| 2,728,282 | 12/1955 | Weiss | 95—31 |
| 3,148,605 | 9/1964 | Peterson et. al. | 95—31 |
| 3,232,196 | 2/1966 | Sapp et al. | 95—31 |
| 3,253,526 | 5/1966 | Steisslinger | 95—31 |

NORTON ANSHER, *Primary Examiner.*

R. A. SCHROEDER, *Assistant Examiner.*

UNITED STATES PATENT OFFICE
CERTIFICATE OF CORRECTION

Patent No. 3,394,643                                                          July 30, 1968

William Howard Horton et al.

It is certified that error appears in the above identified patent and that said Letters Patent are hereby corrected as shown below:

Column 1, line 69, "members" should read -- member --. Column 2, line 4, "of camera" should read -- of a camera --. Column 4, line 56, "rather mounting" should read -- rather large mounting --; line 58, "to" should read -- of --; line 67, "2" should read -- 3 --. Column 5, line 23, "without any" should read -- without in any --.

Signed and sealed this 20th day of January 1970.

(SEAL)

Attest:

Edward M. Fletcher, Jr.

Attesting Officer

WILLIAM E. SCHUYLER, JR.
                                                             Commissioner of Patents